US 8,046,459 B2

(12) United States Patent
Gao et al.

(10) Patent No.: US 8,046,459 B2
(45) Date of Patent: Oct. 25, 2011

(54) METHOD, DEVICE AND SYSTEM OF OBTAINING NETWORK INFORMATION USING DEVICE AS SERVICE CREDENTIAL

(75) Inventors: Ji Gao, Beijing (CN); Zhongqiang Xu, Beijing (CN); Xuehua Li, Beijing (CN)

(73) Assignee: A aigo Digital Technology Co., Ltd., Beijing (CN)

( * ) Notice: Subject to any disclaimer, the term of this patent is extended or adjusted under 35 U.S.C. 154(b) by 18 days.

(21) Appl. No.: 12/307,388

(22) PCT Filed: Jul. 3, 2007

(86) PCT No.: PCT/CN2007/002050
§ 371 (c)(1),
(2), (4) Date: Jan. 5, 2009

(87) PCT Pub. No.: WO2008/006294
PCT Pub. Date: Jan. 17, 2008

(65) Prior Publication Data
US 2009/0292815 A1  Nov. 26, 2009

(30) Foreign Application Priority Data
Jul. 3, 2006  (CN) .......................... 2006 1 0090377

(51) Int. Cl.
*G06F 15/173* (2006.01)
(52) U.S. Cl. .......................................... 709/225; 726/5
(58) Field of Classification Search .................. None
See application file for complete search history.

(56) References Cited

U.S. PATENT DOCUMENTS

| | | | |
|---|---|---|---|
| 5,812,784 A * | 9/1998 | Watson et al. | 709/227 |
| 6,609,198 B1 * | 8/2003 | Wood et al. | 726/8 |
| 7,213,766 B2 * | 5/2007 | Ryan et al. | 235/492 |
| 7,725,928 B2 * | 5/2010 | Durfee et al. | 726/5 |
| 7,765,341 B2 * | 7/2010 | Corbett et al. | 710/36 |
| 2002/0165783 A1 * | 11/2002 | Gonthier et al. | 705/26 |
| 2005/0268330 A1 | 12/2005 | Di Rienzo | |
| 2006/0099991 A1 * | 5/2006 | Bajikar et al. | 455/558 |
| 2006/0185020 A1 * | 8/2006 | Levy | 726/27 |

(Continued)

FOREIGN PATENT DOCUMENTS
CN  1635738 A  7/2005
(Continued)

OTHER PUBLICATIONS

International Search Report for PCT/CN2007/002050 completed Sep. 15, 2007.

*Primary Examiner* — Jeffrey R Swearingen
(74) *Attorney, Agent, or Firm* — Buchanan, Ingersoll & Rooney PC

(57) ABSTRACT

Method, device and system of obtaining the network information using the device as the service credential, which use the device without power supply and display, in which presetting the configuration files containing the information connected to the network, after connecting the device with the online data process device, establishing the information interacting channel between the data process device and the information server to obtain, download the related information. The device as the service credential can be used to store the information, or display, print and output the special network service information by the data process device, and the device can be used as the service object of the special information network and take the voucher function of service.

8 Claims, 3 Drawing Sheets

U.S. PATENT DOCUMENTS

| | | | |
|---|---|---|---|
| 2007/0150249 A1* | 6/2007 | Asamoto | 703/14 |
| 2007/0300220 A1* | 12/2007 | Seliger et al. | 718/1 |
| 2008/0313719 A1 | 12/2008 | Kaliski, Jr. et al. | |
| 2008/0313731 A1 | 12/2008 | Iftimie et al. | |

FOREIGN PATENT DOCUMENTS

| | | | | |
|---|---|---|---|---|
| JP | 2004342068 | A | * | 12/2004 |
| JP | 2007053455 | A | * | 3/2007 |
| KR | 2002089250 | A | * | 11/2002 |
| KR | 2004090318 | A | * | 10/2004 |
| KR | 2005004403 | A | * | 1/2005 |
| KR | 2005108797 | A | * | 11/2005 |
| TW | 200717339 | A | * | 5/2007 |
| TW | 200742982 | A | * | 11/2007 |

* cited by examiner

METHOD, DEVICE AND SYSTEM OF OBTAINING NETWORK INFORMATION USING DEVICE AS SERVICE CREDENTIAL

FIELD OF THE INVENTION

The invention relates to a method and a system of obtaining network information using a passive device without display, i.e. the method and system connecting said device as the service credential to a data processing apparatus to realize network connections in order to obtain service information. The present invention belongs to the computer network communication field.

BACKGROUND OF THE INVENTION

With the development of the Internet and communication technology, people are no longer satisfied that computers are only used in Web-browsing, and text and/or picture printing, but rather focus on the information in reference to their job characteristics and interests to manipulate various kinds of knowledge, thereof. Various characteristic information services such as the information of money, stock, weather tour, as well as restaurant and entertainment are in rapid development.

There are two present methods for users to enjoy the service provided by merchant stations by using a credential. One method is dependent on the VIP card provided by the merchant stations, wherein the VIP card only possesses visually appreciable service credential, and can not obtain the latest service dynamic information of the merchant stations at any moment. The other method is to obtain the service information of the merchant stations by using the network information, but in order to enjoy the services provided by the merchant stations, users must print out the service information provided by the merchant stations. Only with the printing paper containing the service information, can users enjoy the services in the merchant stations. This kind of service credential brings about prodigious inconvenience to users, who cannot enjoy the service provided by the merchant stations at any moment.

SUMMARY OF THE INVENTION

The method, device and system disclosed in the present invention of obtaining network information by using the device as the service credential, are used for solving the above problems by using the passive device without display. Based on the connection between said device in which configuration files containing the information for connecting to the network server are pre-set and online data processing apparatus, an information interacting channel is established between the data processing apparatus and the information server to obtain and download the related information.

The device as service credential can be used for storing information, or displaying and printing out specific network service information by the data processing apparatus, wherein the device used as the service object of the specific information network also has a credential function to enjoy corresponding services.

In order to realize the above purposes of the invention, the method of obtaining network information by using device as service credential comprises the following steps:

(1) establish a connection between a data processing apparatus and a device as service credential connected to a network server;

(2) read the information of the network server and executing the request programs of network access and remote information service by the data processing apparatus;

(3) establish a connection and an information interacting channel between the data processing apparatus and the information server;

(4) obtain the information issued by merchant stations in the information server by the data processing apparatus, and output the information by the data processing apparatus; transmit the requests of user information and operation content by the data processing apparatus;

(5) feed back the related information to the data processing apparatus via an information interacting channel by the information server according to the operation content if the request is validated, or feed back error information and interrupt the operation if the request is not validated.

The following improved scheme will be adopted on the basis of the steps of the method:

that said device is connected to the data processing apparatus and the information interacting channel through the serial bus USB or IEEE1394 bus and furthermore, that the device can store auto-run files and the download by using a flash memory. In addition, step (2) comprises the following execution steps:

(2.1) directly supply power to the device by the data processing apparatus;

(2.2) read the auto-run files in the device by the data processing apparatus;

(2.3) execute the network access request in the auto-run files by the data processing apparatus;

(2.4) send service request to an appointed information server of the auto-run files; and then establish a connection between the data processing apparatus and the information server if the information server responds.

In step (2.3), the network access request includes means of broadband, dial, GPRS as well as the IP address of WAP identification and appointed information server.

In step (4), the user information comprising user's identity, authority, identification password for obtaining information, and the corresponding operation content is immobilized in the auto-run files. The operation content comprises the network access request, the server website of the obtained information and the operation instructions.

In step (5), the information fed back to the data processing apparatus can be written directly into the storage medium of the device, as well as be outputted by printing, fax or E-mail.

In step (5), the latest information updated or supplemented by users can be sent directly to the data processing apparatus, and be written into the storage medium of the device to replace the originals by the data processing apparatus after the validation of the user information.

In step (5), the user information in the information server can be changed, or the user authority can be changed by the network manager after the validation of user information. In addition, the changed information fed back by the data processing apparatus will be written into the storage medium of the device to replace the originals.

Computer, PDA or mobile telephone can be used as the data processing apparatus in the method for obtaining network information by using the device as service credential.

The device as service credential of the present invention which is used for obtaining network information is a passive device without display; but comprises a storage medium and a memory control module. The storage medium includes an application program module, a configuration files module and a memory module of information data.

The application program module stored in the storage medium is used to exchange information with its connective data processing apparatus.

Auto-run files are solidified in the configuration files module, which points to the application program module when the data processing apparatus receive and execute the file so as to exchange information between with the data processing apparatus and the memory control module through the application program module.

The memory control module of the device is provided with an interface controller, the bus hub and the microprocessor all based on the standard of the serial bus, USB bus or the IEEE1394 bus.

Flash memory is used in the device.

The auto-run files solidified in the configuration files module is configured with user's identity, authorization and a verification password for obtaining the information and the corresponding operation content.

The configuration files module is the readable and writable memory module to modify user information and user authority by the information server and write the modified information back to the configuration files module by the data processing apparatus and to replace the originals for next validation.

From the above, the advantages and benefits of the method, device and system of obtaining network information using the device as the service credential are obvious including automatically accessing the network, obtaining information data of the connective information server through the connection with the device and data processing apparatus skip operations of connecting with the network and entering server IP address without any website and complicated computation.

The information obtained is limited to the users who passed the predetermined authentication to provide the characteristic service and member certification system, so as to realize the information service which is used as a portability credential that is updated instantly.

The information obtained could be outputted and free as well and the device could be used as a credential to enjoy the service in a different area to improve the dependence and fidelity of the users with the device to the network resources.

The information of the server and the network is uploaded to the data processing apparatus by the external storage medium, without any system resources occupancy of the data processing apparatus, but bring more casualness to users' operation.

PREFERRED EMBODIMENTS OF THE INVENTION

Figure 1:
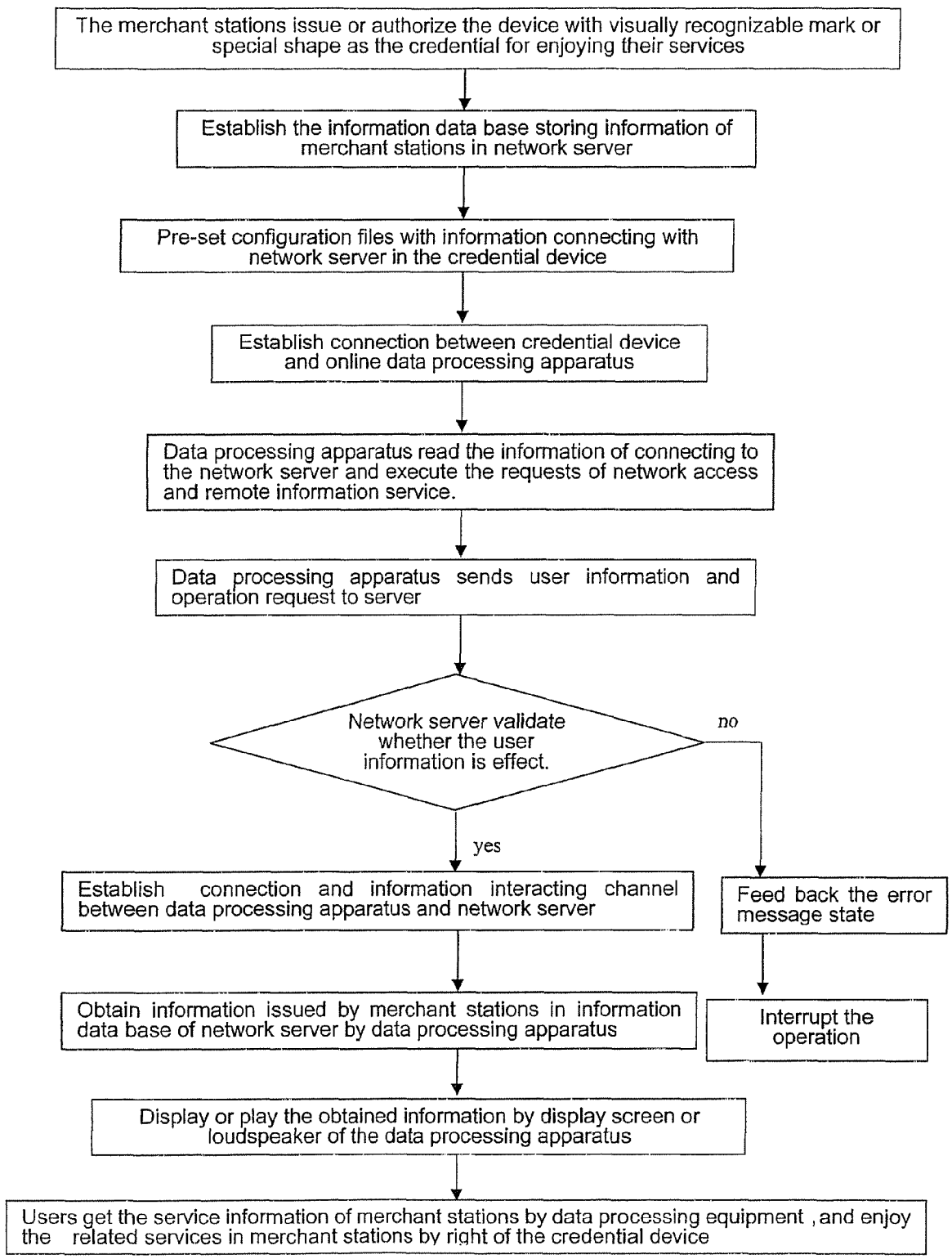
FIG. 1 is a flow diagram of the method of obtaining the network information issued by the merchant stations using the device as service credential.

Embodiment 1, as shown in FIG. 1, the detailed technical scheme of the method of obtaining network information using the device as the service credential is as follows:

(1) the merchant stations issue or certify a device with a visually recognizable mark or a special shape as the credential for enjoying the services;

(2) establish an information database storing information of the merchant stations in the network server;

(3) preset the configuration files connected with the network server in the device used as the credential;

(4) establish the connection between the device used as the credential which is connected with the network server and the online data processing apparatus;

(5) the data processing apparatus reads the information of the network server and executes request programs of network access and remote information services;

(6) a connection and an information interacting channel is established between the data processing apparatus and the information server;

(7) the information issued by the merchant stations in the information server is obtained by the data processing apparatus, and the information is output by display or loudspeaker to the data processing apparatus.

(8) users get the service information of the merchant stations by the data processing apparatus, and enjoy the corresponding service in the merchant stations due to the right of the credential.

The data processing apparatus is a computer, PDA or mobile telephone.

The credential may be a USB disk, memory card shaped as a butterfly and so on. Users may enjoy the service issued by the merchant stations in the network server due to the right of the credential with a specific mark or shape.

Follow the steps below to establish the information data base storing information of the merchant stations in the network server. The service information required by the merchant stations is summarized, and is uploaded by the network to the network server or the Internet service providers. Users can alternatively provide service information to the Internet service provider either by fax or telephone, then the information will be processed and uploaded to the server by the internet service provider to establish the information data base of the merchant stations.

The information is preset and used to connect to the network server in the credential as follows: the information may be auto-run files preset in the credential containing the IP address of the network server, such as a U disk.

The technical schemes which is to preset the auto-run files in USB disk and reading the auto-run files are the prior art without giving necessary details.

The information can even be an operation program preset in the USB disk, which contains the IP address of the network server. Whether the operation programs do run or not is up to users, when the USB disk is connected to the data processing apparatus, such as a computer. If the program is activated by users, the program will be run by the computer in order to connect to the appointed network server.

The information can even be encryption information in the USB disk, while the program used to connect with the server is installed in the computer. The computer activates the program by reading the encryption information in the USB disk when the USB disk is connected to the computer.

The above-mentioned step (5) also includes: after sending user information and the operation request in the credential; on the premise of the request being passed, the related information will be fed back to the data processing apparatus by the interacting channel by the information server according to the operation. Otherwise, an error message will be fed back to interrupt operation.

The user information comprising the user's identity, authority, and identification password for obtaining information, and the corresponding operation content is immobilized in the auto-run files; wherein, the operation content comprises the network access request, the server website of the obtained information and the operation instructions.

The above step (4) includes the method of directly supplying power to the credential by the data processing apparatus.

The access request to the network includes the means of broadband, dial identification and providing access to the IP address of the appointed information server.

The device used as the service credential in this embodiment is the USB disk with the serial bus USB interface and the flash memory.

The USB disk is connected to the online data processing apparatus, such as a computer, to gain access to the network and obtain remote information. It is preferred that automatic connection with the network occur to obtain the network information in this embodiment. The USB disk includes the flash memory and the memory control module.

The flash memory is configured with the application program module, the configuration files module and the memory module. The application program module is used for information interacting with a computer or mobile telephone.

The auto-run files are solidified in the configuration files module, to transmit user information and operation content and point to the application program module. The memory control module is provided with an interface controller based on serial buses USB standard, a bus hub and a microprocessor. The auto-run files, are previously configured with the user identity, authorization, verification password used to obtain informational, and operation content. The operation content contains the request of connecting with the network, the server website of information obtained and operation instructions. The request of gaining access to the network is by means of broadband or dial-up when the USB disk is connected to the computer. Any auto-run instruction pointing to the application program module is written in the auto-run files. In the operating system of windows9x/ME/2000/XP, the auto-run files are autorun.inf. Program instructions preset contains:

[Auto Run]
. . . ,
open=specific directory path\pointed application program filename,
. . . , Wherein, command line "open" points to the application program module to activate the information interactive operation established by the memory control module with the data processing apparatus, when autorun.inf is received and executed by the data processing apparatus. Meanwhile, the application program is previously preset and written into flash memory, furthermore the title and the full path to save are preset in the auto-run files autorun.inf. The method of obtaining information includes the following operation steps: (1) after a USB disk is connected to the USB interface of the computer and identified by the computer, an information interacting channel is established based on the USB bus hub.

Figure 2:
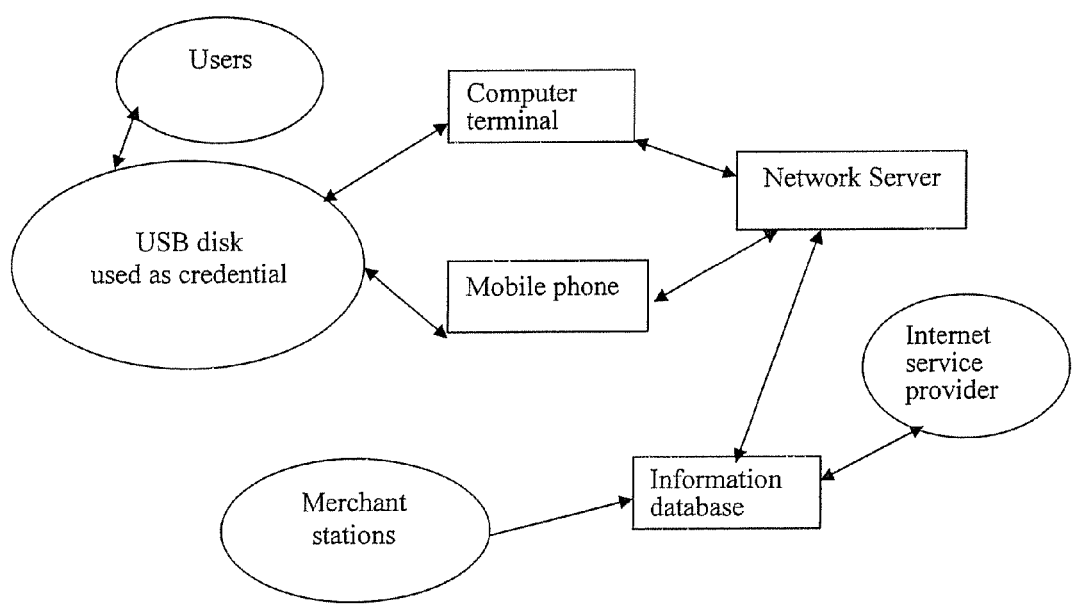
FIG. 2 is a diagram of the system of obtaining network information by using the device used as the service credential.

(2) after receiving the auto-run files autorun.inf by the computer, an executive program of automatic gaining access to the network and remote information service is realized; If information the server responses, valid data is fed back and an interface is opened by the network access apparatus for the data processing apparatus to notify the data processing apparatus that the preparation for access to the network is all ready. (3) The connection and the interacting channel between the data processing apparatus and information server is established. (4) A request of operation and user information including the user identity, authorization and a verification password used to obtain informational is sent by the computer. User information is checked by the server gateway so as to feed back information of error state and interrupt all operation of obtaining information if there is any error. (5) Under the allowance of the validation of user information, the specific information will be fed back to the data processing apparatus according to the appointed operation instructions of operation content by the server. The application system method and the device used as the service credential to obtain network information in the present invention as shown in FIG. 2: compares the device used as the service credential, the data processing apparatus, the server gateway and information data base: Data processing apparatus such as a computer or PDA obtain information from the connected network server through the device used as service credential. That is to say, a computer or PDA links to a corresponding information data base through server gateway to obtain corresponding service information of the merchant stations, users can get up-to-date service information of merchant stations by display of a computer or PDA, or mobile telephone, and enjoy corresponding service in the merchant stations due to the right of the device used as service credential. A visually appreciable distinctive mark is mounted on the surface of the device such as the USB disk, the memory card used as the service credential, either the surface may be made into a specific shape, and the visually appreciable distinctive mark or specific shape is the mark by which users could enjoy the service provided by the merchant stations. At the same time, the device is equipped with an interface connected with a data processing system and the memory used to store information of connecting with the network server.

Plenty of service information of the merchant stations is stored in the information data base of the network server for users to obtain. Merchant stations send their own service information to the server database which could build network connections in the data processing apparatus such as a computer or PDA, or mobile telephone to build the network connections, or merchant stations place their own service information in an information data base of the network server of the internet service provider through a special Internet service provider.

The device with a visually distinctive mark or specific shape used as service credential is recognized by the merchant stations, and users can enjoy the service issued in network server by the merchant stations in merchant stations due to the right of a specific mark or specific shape of the device. The data processing apparatus such as a computer or PDA, mobile telephone, etc. is connected to the corresponding network such as the Internet or a mobile communication net and reads the information in the device used as the service credential after being connected with the data processing apparatus. The data processing apparatus is connected with a corresponding network server in accordance with the information to obtain the service information in a network server issued by the merchant stations. Users could be aware that they could enjoy the service of the merchant stations and the kind of service they could enjoy due to the right of the device used as the service credential, by using the display of the data processing apparatus. After the device, such as a USB disk used as the service credential is connected into the computer, the computer will read information of connecting with the network server preinstalled in the USB disk, and the computer can be connected with the corresponding network server in accordance with the information. The information could be an auto-run program preset in the USB disk. The auto-run program contains the IP address of the network server. The auto-run program being preset in the USB disk and being read by the computer is not prior art. The information can also be an operation program preset in the USB disk.

Figure 3:
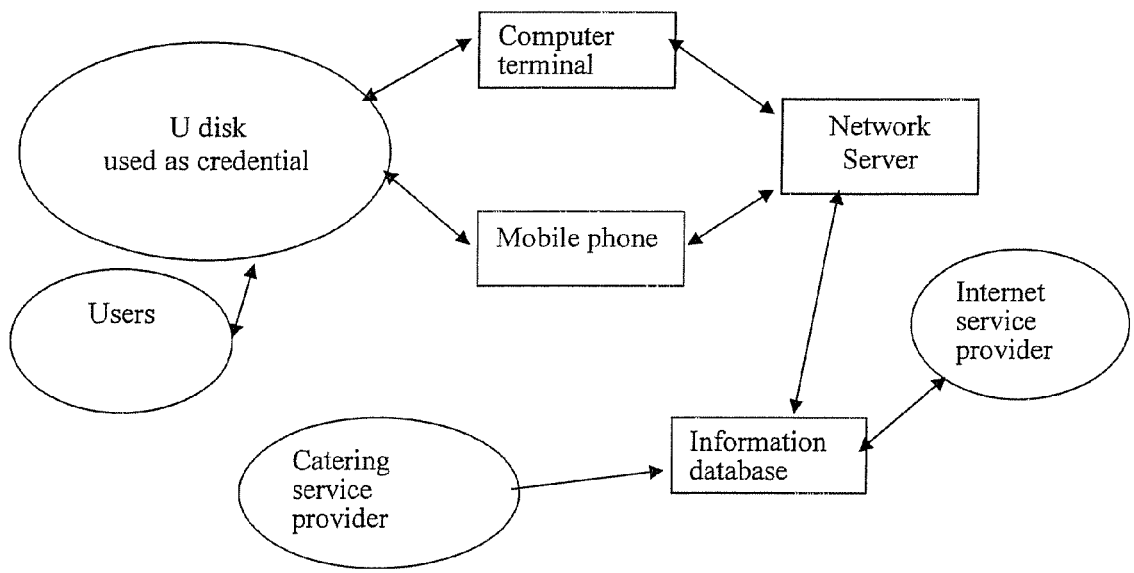
FIG. 3 is the schematic diagram of the system of providing any discount information of the catering service of the present invention.

The program contains the IP address of the network server. After the USB disk is connected to the computer the user can choose whether to run the program and the computer will run the program and connect with the appointed network server if a user activates the program. The information can also be an enciphered message stored in the USB disk, while the program connected with the server is installed in the computer, the program in the computer only is started when the USB disk is being connected to the computer by which the computer reads the enciphered message on the USB disk. It can adopt the following scheme as shown in FIG. 3 to apply the present invention to the information service system providing a foodservice discount. The network service provider can obtain up-to-date discount information from restaurants, and can put it into the server in time. The restaurants also could send the discount information to the network service provider by fax or telephone and so on, as well as by a network with identity authentication. The network service provider classifies the received discount information, and inputs into the server a certain rule. The network service provider could update in real-time the discount information, and classify the information according to the locality of the restaurant making it convenient for users to search.

The aforesaid client terminal program and the application module used to run the client terminal program is installed in the device purchased by the users for the service credential such as the USB disk. Configuration files in the client terminal program contain a network domain name or a network address relating to the foodservice, as well as identity authentication information. The users only need to connect the credential with the client terminal, especially the computer connected with the international internet when they want the update information of the foodservice discount, and the program in credential will automatically or manually run. A program sends an operation request to the server managed by the network service provider, and the information required by the user will be fed back to the client terminal by the server. Returned information could be tackled by the client terminal program or be shown in a client terminal display, either prompts the user by a phonetic mode.

The user can customize their own individual information by right of presence of the user's identity authentication mechanism. The server will feed back corresponding information to the user in accordance with the user's requirement such as flavor, grade, locality, period of discount, special restaurant, after the server recognizes the user. The device held by the user used as the service credential can be designed as having a distinctive appearance, such as a pen type or a card form, and used as the credential for obtaining corresponding service. Applying the present invention to the system of foodservice could establish an information communication channel between the consumer and restaurant operator. On the one hand, the restaurant operator could issue an immunity measure in time in accordance with the change of requirement, and reduce the cost for advertisement. On the other hand, the consumer with no knowledge of the computer operation can obtain the latest foodservice buckling information conveniently. The present invention can also be used for other information issue system requiring fast update, and users need no computer operation skill, and it is convenient and rapid. The client group can be improved for the operator, and the availability effect is obvious. The embodiment hereinbefore described in accordance with the figures is the preferred one to realize the purpose of the present invention. The motivation has been provided to the person of ordinary skill in this art to deduce other substituted technical schemes which is in the protection scope of the claims.

The invention claimed is:

1. A method of obtaining network information using a device as a service credential, comprising the following steps, steps:
   (1) establishing a connection between a data processing apparatus and the device configured with network server information that is to be used as the service credential;
   (2) in the data processing apparatus, reading said information for connecting to a network server and executing a request of accessing a network and a remote information tele-service;
   (3) establishing a connection and an information interacting channel between the data processing apparatus and an information server;
   (4) sending a request to obtain information in the information server issued by merchant stations, user information of the device and operation content further to be sent by the data processing apparatus; and
   (5) feeding back requested information to the data processing apparatus through the information interacting channel by the information server according to the operation content if the request is validated, otherwise, feeding back error information and the interrupting an operation if the request is not validated;
   wherein step (2) comprises the following process:
   (2.1) the data processing apparatus supplying power directly to the device;
   (2.2) auto-run files in the device being read by the data processing apparatus;
   (2.3) a network access request of the auto-run files being executed by the data processing apparatus; and
   (2.4) a service request being sent to the information server which is identified in the auto-run files and a connection being established between the data processing apparatus and the information server which is identified in the auto-run files if the information server responds;
   wherein, in step (5), latest information updated or supplemented in the information server can be sent directly to the data processing apparatus after a latest connection by users, and written into a storage medium of the device to replace originals by the data processing apparatus after the validation of user information; or
   in step (5), the user information in the information server can be changed, or user authority adopted to be changed by a network manager after the validation of the user information and in addition, changed information fed back by the data processing apparatus is adopted to be written into the storage medium of the device to replace the originals;
   wherein, the device used as the service credential has a specific mark or a specific shape.

2. The method according to claim 1, wherein in step (2.3), the network access request includes one of: broadband, dialing, GPRS, or WAP authentication and an IP address of the identified information server.

3. The method according to claim 2, wherein, in step (4), the user information stored in the auto-run files includes user identity, authorization, a verification password for obtaining information, and the operation content corresponding to the user information; and the operation content includes a network access request, and a server website used to obtain information and operation instructions.

4. The method according to claim 3, wherein, in step (5), the information fed back to the data processing apparatus is written directly into the storage medium of the device, and/or exported by printing, facsimile or electronic mail.

5. The method according to claim 4, wherein the data processing apparatus is one of a computer, PDA or mobile telephone.

6. A device obtaining network information and used as a service credential, said device comprising a passive device without a display, and configured with a storage medium and a memory control module, wherein;

said storage medium includes an application program module, configuration files module and a memory module of information data; and the application program module is stored in the storage medium, and is used to exchange information between data processing apparatus and the storage medium; and auto-run files are contained in the configuration files module, the application program module is identified when the data processing apparatus receive and executes the auto-run files, and an information interactive operation proceeds between the application program module and the data processing apparatus via the memory control module;

wherein said auto-run files contained in the configuration files module are configured with user identity, authorization and a verification password for obtaining information, and operation content corresponding to user information;

and wherein said configuration files module is a readable and rewritable memory module;

wherein, the device used as the service credential has a specific mark or a specific shape.

7. The device according to claim 6, wherein the memory control module of said device is provided with an interface controller based on serial buses a USB or IEEE 1394 bus standard, a bus hub and a microprocessor.

8. The device according to claim 7, wherein said device includes a flash memory medium.

* * * * *